United States Patent
Jankovic et al.

(10) Patent No.: US 11,121,520 B1
(45) Date of Patent: Sep. 14, 2021

(54) PASSIVE SWITCHING IN INTEGRATED OPTICAL COMPONENTS

(71) Applicants: Vladan Jankovic, Santa Monica, CA (US); Andrea Armani, Pasadena, CA (US)

(72) Inventors: Vladan Jankovic, Santa Monica, CA (US); Andrea Armani, Pasadena, CA (US)

(73) Assignees: NORTHROP GRUMMAN SYSTEMS CORPORATION, Falls Church, VA (US); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 41 days.

(21) Appl. No.: 16/554,089

(22) Filed: Aug. 28, 2019

(51) Int. Cl.
 *H01S 3/11* (2006.01)
(52) U.S. Cl.
 CPC ..................................... *H01S 3/11* (2013.01)
(58) Field of Classification Search
 CPC ... H01S 3/11; H01S 3/094; H04Q 5/00; G02F 1/01
 USPC ....................... 372/11, 22, 39, 43.01; 438/29; 257/E21.002
 See application file for complete search history.

(56) References Cited

U.S. PATENT DOCUMENTS

| | | | |
|---|---|---|---|
| 4,283,113 A | 8/1981 | Eden | |
| 7,035,498 B2 | 4/2006 | Wu et al. | |
| 7,443,902 B2 | 10/2008 | Scherer | |
| 2002/0130312 A1* | 9/2002 | Yu | H01L 27/30 257/2 |
| 2006/0043541 A1 | 3/2006 | Tetelbaum | |
| 2006/0159132 A1* | 7/2006 | Young | H01S 3/0627 372/10 |
| 2008/0291948 A1* | 11/2008 | McCarthy | H01S 3/042 372/10 |
| 2011/0111147 A1 | 5/2011 | Agrawal et al. | |
| 2011/0175061 A1 | 7/2011 | Berkley et al. | |
| 2011/0243158 A1* | 10/2011 | Spiekermann | H01S 3/0627 372/11 |

(Continued)

FOREIGN PATENT DOCUMENTS

| | | |
|---|---|---|
| CN | 109095499 A | 12/2018 |
| EP | 0699921 A2 | 3/1996 |

OTHER PUBLICATIONS

Pollack, et al.: "Passive Q Switching and Mode-Locking of Er:glass Lasers Using VO2 Mirrors"; Journal of Applied Physics 78, 3592 (1995); doi: 10.1063/1.359934; View online: http://dx.doi.org/10.1063/1.359934.

(Continued)

*Primary Examiner* — Tuan N Nguyen
(74) *Attorney, Agent, or Firm* — Tarolli, Sundheim, Covell & Tummino LLP

(57) ABSTRACT

Systems and methods are provided for providing a passively switched light source. An integrated optical component includes a photonic material and a phase change material in direct contact with the photonic material. A light source provides light into the integrated optical component. The light interacts with the phase change material such that an index of refraction of the phase change material depends on the intensity of the light within the integrated optical component as to provide a passive change to a parameter of the integrated optical component.

10 Claims, 3 Drawing Sheets

(56) References Cited

U.S. PATENT DOCUMENTS

2017/0297750 A1 10/2017 Liu et al.
2018/0334269 A1 11/2018 Yoshimoto et al.

OTHER PUBLICATIONS

Bugaev, et al.: "Q Switching of a Resonator by the Metal-Semiconductor Phase Transition"; A. F. Ioffe Physicotechnical Institute, Academy of Sciences of the USSR, Leningrad (Submitted Apr. 2, 1981) Kvantovaya Elektron. (Moscow) 8,2693 2695 (Dec. 1981).
International Search Report arid Written Opinion for International Application No. PCT/US2019/055011 dated Jan. 9, 2020.
Shao-Hua Wu, et al., "Thermal homeostasis using microstructured phase-change materials", OPTICA, vol. 4, No. 11, Nov. 8, 2017, p. 1390, XP055653822, DOI: 10.1367/OPTICA.4.001390, figures 2, 3, 5.
Brent L. Danner, et al., "Characterizing Metal-insulator-Transition (MIT) Phase Change Materials (PCM) for RF And DC Microswitching Elements", Procedia Engineering, vol. 47, Jan. 1, 2012, pp. 80-83, XP055654077, Amsterdam, NL, ISSN: 1877-7058, DOI: 10.1016/j.proeng.2012.09.089, abstract.

* cited by examiner

“photonic material” can comprise
PASSIVE SWITCHING IN INTEGRATED OPTICAL COMPONENTS

TECHNICAL FIELD

This invention relates to optical systems, and more particularly, to passive switching in integrated optical components.

BACKGROUND

High repetition rate pulsed laser sources have numerous applications throughout fundamental science and applied technology. The utility of a pulsed source however is directly related to the precision and stability of the pulse train. Typically, the pulses are controlled electronically, resulting in extremely large footprint systems with high power requirements.

SUMMARY OF THE INVENTION

In accordance with an aspect of the present invention, a system includes an integrated optical component that includes a photonic material and a phase change material in direct contact with the photonic material. A light source provides light into the integrated optical component. The light interacts with the phase change material such that an index of refraction of the phase change material depends on the intensity of the light within the integrated optical component as to provide a passive change to a parameter of the integrated optical component.

In accordance with another aspect of the present invention, a method provides a passively switched, pulsed light source. A solid state phase change material is layered in direct contact with a photonic material to form an integrated optical component. Light is pumped into the integrated optical component, such that the light interacts with the solid state phase change material.

In accordance with yet another aspect of the present invention, a pulsed light source includes an integrated optical component, including a photonic material and a phase change material in direct contact with the photonic material, and a light source that provides light into the integrated optical component. The light interacts with the phase change material such that a state of the phase change material depends on the intensity of the light within the integrated optical component as to provide a passive change to a quality factor of the integrated optical component. The integrated optical component amplifies the internally refracted light when the phase change material is in a first, optically transparent state and absorbs the confined light when the phase change material is in a second, optically lossy state.

DETAILED DESCRIPTION OF THE INVENTION

Systems and methods are provided herein for passive switching in integrated optical components using solid state materials disposed in direct contact with the photonic material of the integrated optical component. Specifically, the inventors propose an integrated optical device that has a parameter that varies with a state of the solid state phase change material, such that the device operates in one manner when the solid state phase change material is in a first state and in another manner when the solid state phase change material is in a second state. The transition between the two states is itself provoked by the presence or absence of light intensity and concomitant thermal power within the integrated optical device, and thus the device can be passively switched between the two modes. By "passively", it is meant that no external stimulus is employed to trigger the state transition—the phase transition is triggered solely by the light passing through the integrated optical component.

In one example, the device is a micro-sphere, micro-toroid or integrated photonic micro-ring resonator that has a high quality factor when the solid state phase material is in a first state, but has a sharply reduced quality factor when the solid state phase material is in a second state. The solid state phase change material changes to the second state when a critical amount of light is captured in the resonator, and reverts to the first state when the resonator releases the accumulated light. Other examples of appropriate integrated optical devices that could be passively switched by the methods disclosed herein include optical switches, add-drop filters, waveguides, Raman lasing media, four-wave mixers, and optical parametric oscillators.

Figure 1:
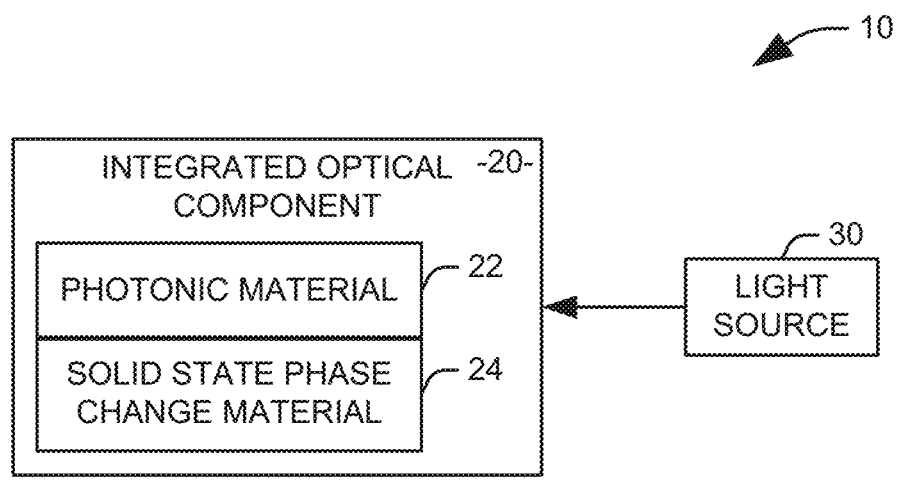
FIG. 1 illustrates an integrated optical system that utilizes passive switching via a solid state phase change material.

FIG. 1 illustrates an integrated optical system 10 that utilizes passive switching via a solid state phase change material. To this end, the system 10 includes an integrated optical component 20 comprising a photonic material 22 and a phase change material 24 in direct contact with the photonic material. It will be appreciated that, for the purposes of this application, a "photonic material" can comprise any material suitable for use for transmitting light within an integrated optical system, including semiconductor materials, such as silicon and germanium, amorphous materials such as silica and plastics, organic materials, hybrid organic-inorganic materials, non-linear optical materials, and crystalline materials. A phase change material, as discussed herein, is a material that can transition between two phases in the solid state. Examples include vanadium dioxide, samarium nickelate, poly(3-hexylthiophene), germanium telluride, and germanium-antimony-tellurium.

As light passes through the integrated optical component 20, the light interacts with the phase change material 24, altering an index of refraction of the phase change material. As used here, the index of refraction refers not only to the real part of the index of refraction, but also to the imaginary part of the index, generally referred to as the extinction coefficient. When either part of the complex index of refraction for the phase change material 24 is changed, the optical properties of the optical component 20 also change. For example, a resonant optical device might move off resonance or increase absorption. For a device that contains light via total internal reflection, this change in the complex index of refraction can greatly impact the ability of the device to maintain confinement of the light, allowing for a release of a light pulse.

A light source 30 provides light to the integrated optical component 20. In one implementation, the light source provides light having a wavelength between four hundred nanometers and four micrometers. The light interacts with the phase change material 24 such that an index of refraction of the phase change material depends on the intensity of the light within the integrated optical component. Specifically, the phase change material 24 can change its phase in response to any of heat, electrical or magnetic fields, or similar physical changes resulting from the passage of the light through the integrated optical component 20. Accordingly, a parameter of the integrated optical component 20 can be changed passively, such that no additional input is provided to control the state of the phase change material 24.

It will be appreciated that the nature of the parameter altered by the transition of the solid state phase change material can vary with the nature of the integrated optical component. In one implementation, the integrated optical component is a waveguide, and the parameter is an optical loss of the waveguide. In another implementation, the integrated optical component is a resonator, and the parameter is either a quality factor of the resonator or a resonant wavelength of the resonator. In yet another implementation, the integrated optical component is a splitter, and the parameter is a direction of travel of the light through the splitter. In still another implementation, the integrated optical component is an add/drop filter, and the parameter is one of a passband and a stopband of the add/drop filter.

Figure 2:
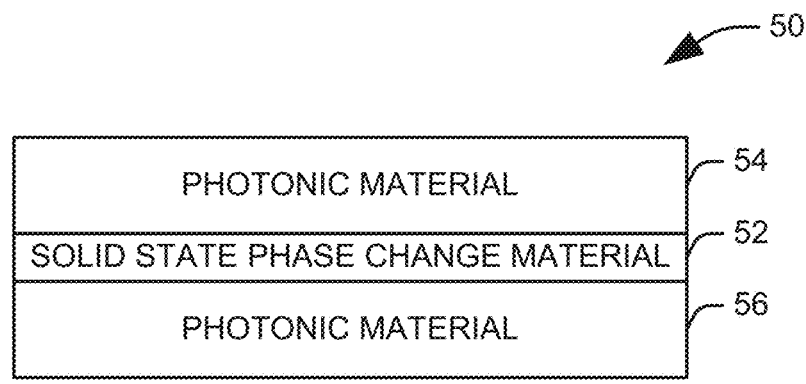
FIG. 2 illustrates a resonator assembly using passive switching.

FIG. 2 illustrates one implementation of an integrated optical component, specifically a microring resonator 50 for a passive Q-switched laser implemented as an integrated photonic circuit. The illustrated resonator cavity 50 could, for example, be used to provide a stable, low-footprint pulsed light source operating at a rate on the order of femtoseconds for light of nearly arbitrary wavelengths. In practice, the resonator cavity 50 can take on any of a number of shapes, including a microsphere, a microtoroid, and a triangular cylinder.

High quality factor (Q) silica optical micro-cavities are able to confine light for long periods of time, resulting in large circulating optical intensities. They are an ideal platform for creating integrated photonic circuit low threshold lasers (e.g., rare earth doped or Raman). Unfortunately, high quality factor silica microring resonators suffer from thermal issues due to the high intensity of circulating light. The illustrated microring resonator 50 exploits the thermal energy contained in the circulating field to initiate a phase change of a thin film of a solid state phase change material 52 sandwiched between two microdisks 54 and 56 of a photonic material. For example, the photonic material can include silica ($SiO_2$) doped with a lasing material, such as Yb:$ErY_2O_3$, or indium phosphide. When the solid state phase change material 52 is in a first state, the resonator cavity 50 has a high quality factor, and can confine light for long periods of time. As the circulating optical intensity in the resonator cavity increases, however, the temperature of the solid state phase change material is increased.

When the temperature within the solid state phase change material 52 reaches a critical temperature, the transmittance of the solid state phase change material 52, represented by the complex component of the index of refraction, changes, significantly reducing the quality factor (Q) of the resonator cavity 50. As a result, light within the resonator cavity 50 is released, and the temperature at the phase change material 52 can reduce below the critical temperature, allowing the state of the solid state phase change material to revert to the original state and the transmittance of the material to return to its original value. As a result, the high quality factor of the resonator cavity 50 is restored, and the light confined by the resonator can increase to a sufficient level to trigger another phase transition in the solid state phase change material 52, creating a regenerative optical bi-stability effect. The repetition rate of the resonator cavity 50 can be selected by varying the thickness of the layer of solid state phase change material 52. Further, the specific solid state phase change material can be selected according to the desired operating characteristics of the resonator cavity, such that a transition point of the solid state phase change material will be reliable reached by light contained within the device.

In one example, the solid state phase change material 52 can be vanadium dioxide ($VO_2$). A quality factor of the resonator is not materially affected by the presence of the vanadium dioxide in its dielectric state, but when the vanadium dioxide switches from a dielectric state to a metallic, it drastically reduces the resonator quality factor, by at least an order of magnitude. When this happens, if the microdisks 54 and 56 are operated at the right temperature, the solid state phase change material 52 will go back to the dielectric state. As soon as it does that, the cavity Q will go up and the resonator will start lasing again. This cycle will repeat as the optical energy starts building up in the cavity again. So long as the resonator operates near the temperature of the $VO_2$ phase transition, which is about seventy degrees Celsius, it can be switched with the circulating resonator power and should be self-regulating.

Figure 3:
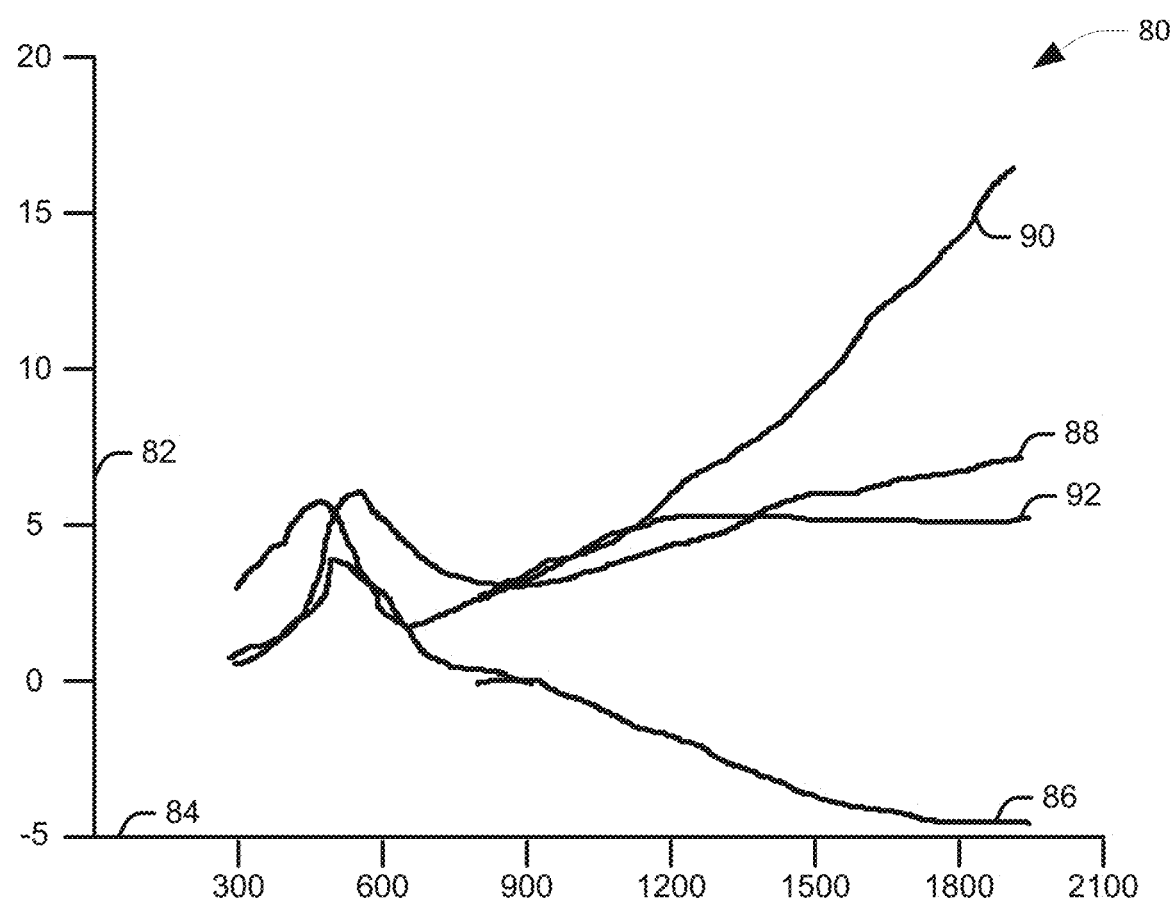
FIG. 3 is a chart illustrating the performance of one example of an integrated optical component in accordance with the system and methods presented herein.

FIG. 3 is a chart 80 illustrating the performance of one example of an integrated optical component in accordance with the system and methods presented herein. In the illustrated example, integrated optical component is a microtoroid resonator, and the performance of integrated optical component is evaluated by modulating the wavelength of light provide to the component and measuring the light transmitted from the component. A dielectric permittivity of the integrated optical component is represented by a vertical axis 82, and the wavelength of the incident light is represented in nanometers on a horizontal axis 84.

A first plot 86 represents the real part of the dielectric permittivity of the integrated optical component when the solid state phase change material is in the metallic state. A second plot 88 represents the real part of the dielectric permittivity of the integrated optical component when the solid state phase change material is in the dielectric state. As can be seen from the chart, the real part of the dielectric permittivity is larger in the dielectric state than in the metallic state, and the divergence between the two states increases sharply for wavelengths above nine hundred nanometers.

A third plot 90 represents the imaginary part of the dielectric permittivity of the integrated optical component when the solid state phase change material is in the metallic state. A fourth plot 92 represents the imaginary part of the dielectric permittivity of the integrated optical component when the solid state phase change material is in the dielectric state. It will be appreciated that the imaginary part of the dielectric permittivity increases sharply for wavelengths above twelve hundred nanometers when the solid state phase change material is in the metallic state, while remaining relatively constant for the dielectric state.

Figure 4:
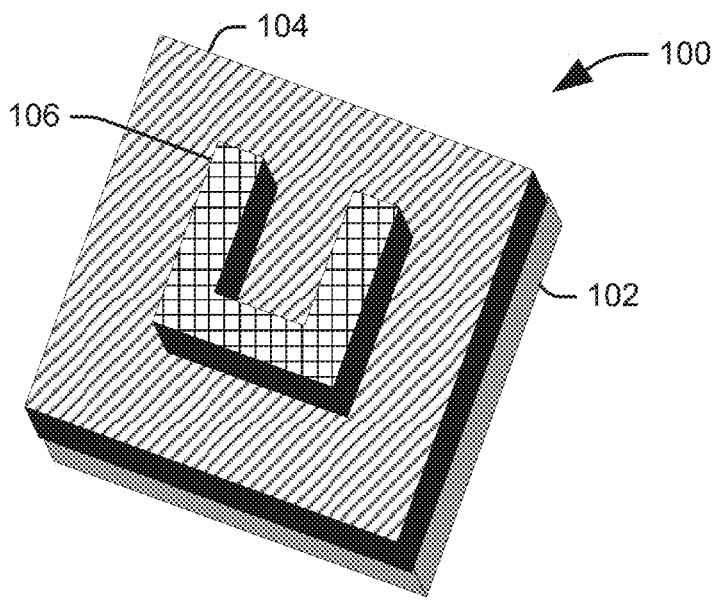
FIG. 4 illustrates one example of a planar hybrid solid state relay using a solid state phase change material for passive switching.

FIG. 4 illustrates one example of a planar hybrid solid state relay 100 using a solid state phase change material for passive switching. The solid state relay 100 is implemented on a wafer 102 of an $ABO_3$-type oxide having a cubic Perovskite structure. A layer of vanadium dioxide 104 is deposited onto the wafer, and a patterned layer of silver 106 can be applied onto the vanadium dioxide to provide the planar hybrid solid state relay 100. The resulting device can provide a completely passive repetition rate on the order of fifteen nanoseconds.

Figure 5:
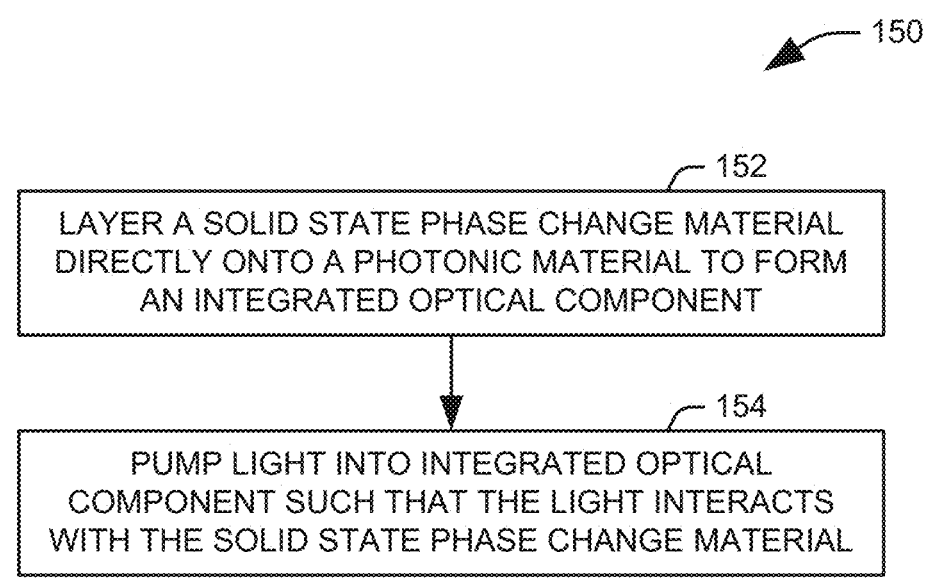
FIG. 5 illustrates a method for providing a passively switched, pulsed light source.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 5 illustrates a method 150 for providing a passively switched, pulsed light source. At 152, a solid state phase change material is layered onto a photonic material, such that the solid state phase change material is in direct contact with the photonic material, to form an integrated optical component. In one implementation, the solid state phase change material is vanadium dioxide. A thickness of the layered solid state phase change can be selected to provide a desired repetition rate for the pulsed light source. In one implementation, the layer of solid state phase change material can be applied by conformally coating the material onto the photonic material. This allows the optical cavity symmetry, wall smoothness, and quality factor to be controlled and precisely tuned for optimal performance.

The solid state phase change material itself can be selected according to specific properties of the desired pulsed light source, such as a thickness of the photonic material, a power of a pump providing light to the integrated optical component, and a temperature regulation of the integrated optical component, to ensure that a transition point of the solid state phase change material falls within operating parameters of the integrated optical component. Alternatively, the solid state phase change material can be selected for other desirable properties. For example, a two-dimensional material can be selected for use in the integrated photonic component.

At 154, light is pumped into the integrated optical component, such that the light interacts with the solid state phase change material. In one implementation, the light interacts with the solid state phase change material such that an index of refraction of the solid state phase change material depends on the intensity of the light. Accordingly, a parameter of the integrated optical component can be passively changed during the passage of light through the device.

In one example, the parameter is a quality factor of the integrated optical component. As the quality factor of the integrated optical component changes, it will be appreciated that the ability of the integrated optical component to contain light will be altered. As a result, when the solid state phase change material is in a first state, and the quality factor is high, light can accumulate within the integrated optical component. When the light intensity becomes sufficient to trigger a state transition in the solid state phase change material, the quality factor changes and the light is released to provide a light pulse. In the absence of the light, the solid state phase change material can shift back to its original state, allowing the quality factor of the integrated optical component to revert back to its original value and light to being accumulating in the component.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system, comprising:
a resonator comprising a photonic material and a phase change material in direct contact with the photonic material; and
a light source that provides light into the resonator, the light interacting with the phase change material such that a state of the phase change material depends on the intensity of the light within the resonator, a quality factor of the resonator being dependent on the state of the phase change material, such that the resonator amplifies the internally refracted light when the phase change material is in a first, optically transparent dielectric state and absorbs the confined light when the phase change material is in a second, optically lossy metallic state.

2. The system of claim 1, wherein the resonator is a resonant cavity of a laser, and the phase change material is vanadium dioxide.

3. The system of claim 1, wherein each of the photonic material and the phase change material are fabricated from two-dimensional materials.

4. The system of claim 1, wherein the light source provides light having a wavelength between four hundred nanometers and four micrometers.

5. A pulsed light source, comprising:
an integrated optical component comprising a photonic material and a phase change material in direct contact with the photonic material, wherein the phase change material is vanadium oxide; and
a light source that provides light into the integrated optical component, the light interacting with the phase change material such that a state of the phase change material depends on an intensity of the light within the integrated optical component, a quality factor of the integrated optical component being dependent on the state of the phase change material, such that the integrated optical component amplifies the internally refracted light when the phase change material is in a first, optically transparent dielectric state and absorbs the confined light when the phase change material is in a second, optically lossy metallic state.

6. The pulsed light source of claim 5, wherein the phase change material has a first index of refraction in the first state and a second index of refraction in the second state.

7. The pulsed light source of claim 5, wherein the photonic material is silica, and the pulsed light source is a laser.

8. The pulsed light source of claim 5, wherein the light source provides light having a wavelength between four hundred nanometers and four micrometers.

9. A system, comprising:
a resonator comprising a photonic material and a phase change material in direct contact with the photonic material; and
a light source that provides light into the resonator, the light interacting with the phase change material such that a state of the phase change material depends on an intensity of the light within the resonator, a resonant wavelength of resonator being dependent on the state of the phase change material, such that the resonator has a first resonant wavelength when the phase change material is in a first, optically transparent dielectric state and a second resonant wavelength when the phase change material is in a second, optically lossy metallic state.

10. A system, comprising:

an optical splitter comprising a photonic material and a phase change material in direct contact with the photonic material; and a light source that provides light into the optical splitter, the light interacting with the phase change material such that a state of the phase change material depends on an intensity of the light within the optical splitter, a direction of travel of the light within the splitter being dependent on the state of the phase change material, such that the optical splitter directs light along a first path when the phase change material is in a first, optically transparent dielectric state and directs light along a second path when the phase change material is in a second, optically lossy metallic state.

* * * * *